(12) United States Patent
Sugiyama

(10) Patent No.: US 8,472,759 B2
(45) Date of Patent: Jun. 25, 2013

(54) OPTICAL DEVICE AND OPTICAL TRANSMITTER

(75) Inventor: Masaki Sugiyama, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 190 days.

(21) Appl. No.: 12/985,707

(22) Filed: Jan. 6, 2011

(65) Prior Publication Data

US 2011/0188799 A1    Aug. 4, 2011

(30) Foreign Application Priority Data

Jan. 29, 2010  (JP) ................................. 2010-019347

(51) Int. Cl.
*G02F 1/035* (2006.01)
(52) U.S. Cl.
USPC ............................................................ 385/3
(58) Field of Classification Search
USPC ............................................................ 385/3
See application file for complete search history.

(56) References Cited

U.S. PATENT DOCUMENTS

| | | | | |
|---|---|---|---|---|
| 4,763,973 A * | 8/1988 | Inoue et al. | ...... | 385/12 |
| 6,801,675 B2 * | 10/2004 | Doi et al. | ...... | 385/3 |
| 7,272,271 B2 * | 9/2007 | Kaplan et al. | ...... | 385/3 |
| 2007/0217733 A1 * | 9/2007 | Wada | ...... | 385/8 |
| 2008/0112710 A1 * | 5/2008 | Tanaka et al. | ...... | 398/188 |
| 2009/0279825 A1 * | 11/2009 | Kawanishi et al. | ...... | 385/2 |
| 2010/0014801 A1 * | 1/2010 | Doi | ...... | 385/3 |
| 2010/0080507 A1 * | 4/2010 | Shiraishi | ...... | 385/14 |
| 2010/0111463 A1 * | 5/2010 | Mori et al. | ...... | 385/2 |
| 2010/0266234 A1 * | 10/2010 | Kinpara et al. | ...... | 385/2 |
| 2011/0019956 A1 * | 1/2011 | Sugiyama | ...... | 385/2 |
| 2011/0164844 A1 * | 7/2011 | Higuma et al. | ...... | 385/2 |

FOREIGN PATENT DOCUMENTS

| | | |
|---|---|---|
| JP | 2001-174766 | 6/2001 |
| JP | 2008-39859 | 2/2008 |
| JP | 2008-197639 | 8/2008 |
| JP | 2009-53444 | 3/2009 |

OTHER PUBLICATIONS

Japanese Patent Office Action mailed Feb. 5, 2013, for corresponding Japanese Patent Application No. 2010-019347.

* cited by examiner

*Primary Examiner* — Charlie Peng
(74) *Attorney, Agent, or Firm* — Staas & Halsey LLP

(57) ABSTRACT

An optical device includes a substrate having an electro-optical effect; a main waveguide provided on the substrate; a first Mach-Zehnder part having first waveguides provided on the substrate and coupled with the main waveguide, and first DC electrodes provided between the first waveguides and on the first waveguides and used to generate DC electric fields in the first waveguides; and second Mach-Zehnder parts respectively associated with the first waveguides and comprising second waveguides coupled with each of the first waveguides and second DC electrodes used to generate DC electric fields in the second waveguides, at least one of the second Mach-Zehnder parts being configured to have no second DC electrode provided between the second waveguides and have the second DC electrodes on the second waveguides.

20 Claims, 12 Drawing Sheets

OPTICAL DEVICE AND OPTICAL TRANSMITTER

CROSS-REFERENCE TO RELATED APPLICATION

This application is based upon and claims the benefit of priority of the prior Japanese Patent Application No. 2010-019347, filed on Jan. 29, 2010, the entire contents of which are incorporated herein by reference.

FIELD

The embodiments discussed herein are related to an optical device and an optical transmitter, and are related to, for example, an optical device and an optical transmitter equipped with a Mach-Zehnder part.

BACKGROUND

In optical communication systems, a Mach-Zehnder pat is used as an optical modulator. The Mach-Zehnder part that utilizes the Mach-Zehnder interference is configured to have a pair of optical waveguides on a substrate having the electro-optical effect. Electric fields are applied to the optical waveguides by using electrodes in order to change the refractive indexes in the optical waveguides. This changes the difference in phase between the pair of optical waveguides. For example, the pair of optical waveguides is combined to yield the Mach-Zehnder interference, and a signal light with the optical strength being modulated is thus obtained.

In order to output a signal light modulated by QPSK (Quadrature Phase Shift Keying), there is known an optical modulator in which a secondary Mach-Zehnder part is connected to each of the pair of optical waveguides of a primary Mach-Zehnder part (see U.S. Pat. No. 7,272,271, for example).

In a case where the multiple Mach-Zehnder parts are integrated on the single substrate, there is known an art of forming a groove on the substrate so as to be located between the Mach-Zehnder parts in order to suppress crosstalk between these Mach-Zehnder parts (see Japanese Laid-Open Patent Application No. 2009-53444, for example). Further, there is known an art of forming a groove on the back surface of the substrate (see Japanese Laid-Open Patent Application No. 2001-174766, for example).

SUMMARY

According to an aspect of the present invention, crosstalk between Mach-Zehnder parts is suppressed.

According to another aspect of the present invention, there is provided an optical device including a substrate having an electro-optical effect; a main waveguide provided on the substrate; a first Mach-Zehnder part having first waveguides provided on the substrate and coupled with the main waveguide, and first DC electrodes provided between the first waveguides and on the first waveguides and used to generate DC electric fields in the first waveguides; and second Mach-Zehnder parts respectively associated with the first waveguides and comprising second waveguides coupled with each of the first waveguides and second DC electrodes used to generate DC electric fields in the second waveguides, at least one of the second Mach-Zehnder parts being configured to have no second DC electrode provided between the second waveguides and have the second DC electrodes on the second waveguides.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
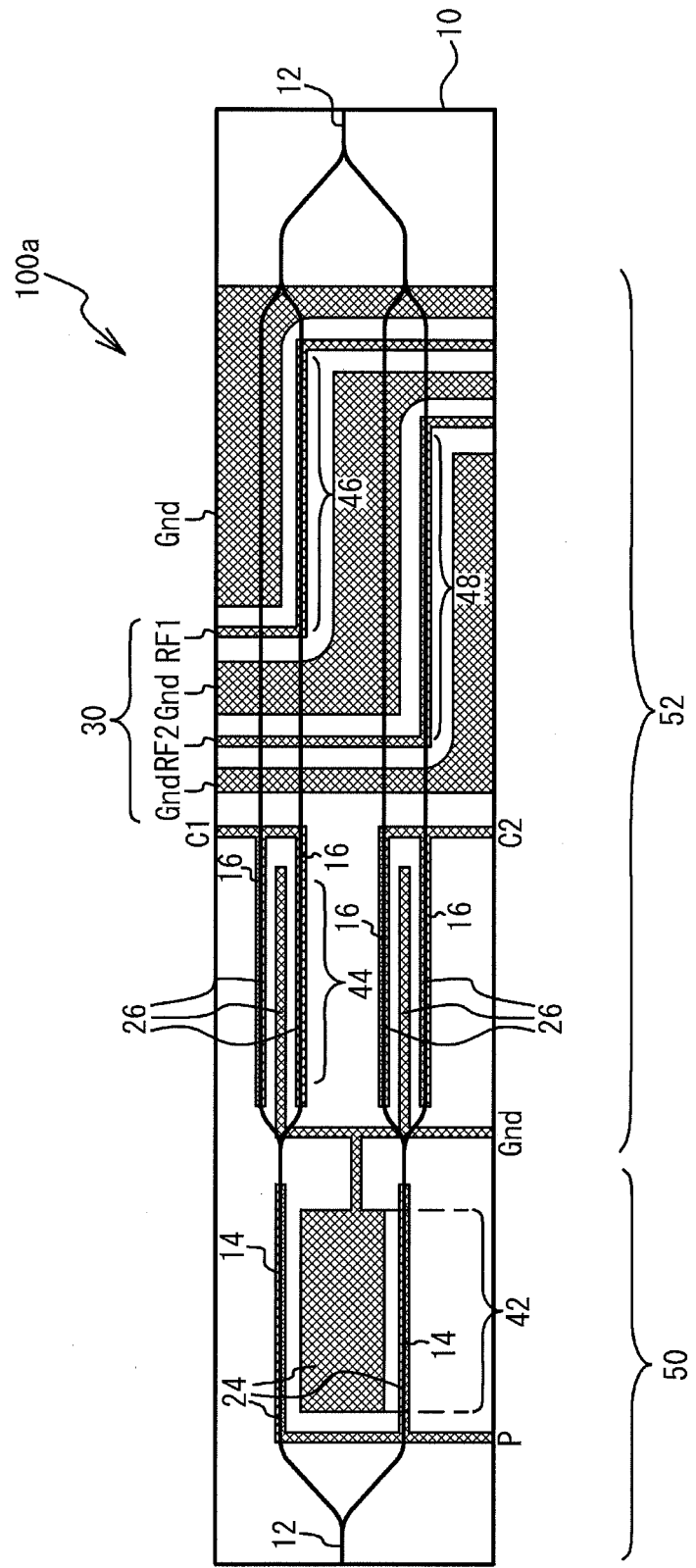
FIG. 1 is a plan view of an optical device in accordance with a first comparative example.

First, an optical device in accordance with a first comparative example is described. The first comparative example is an exemplary optical device for outputting a QPSK-modulated light signal. FIG. 1 is a plan view of an optical device in accordance with the first comparative example. Referring to FIG. 1, an optical device 100a is equipped with a first Mach-Zehnder part 50 and multiple second Mach-Zehnder parts 52. On a substrate 10 having the electro-optical effect, there are provided, as optical waveguides, a main waveguide 12, first waveguides 14 and second waveguides 16. On the substrate 10, there are further provided first DC (Direct Current) electrodes 24, second DC electrodes 26 and RF or high-frequency electrodes 30. The first Mach-Zehnder part 50 includes the multiple first waveguides 14 (one pair in FIG. 1), and the first DC electrodes 24 used to generate DC electric fields within the first waveguides 14. The first DC electrodes 24 include electrodes that are provided on the first waveguides 14 and are supplied with a voltage P, and a further electrode that is provided between the first waveguides 14 and is set at a ground voltage Gnd.

Each of the multiple second Mach-Zehnder parts 52 (one pair in FIG. 1) is associated with a corresponding one of the first waveguides 14 of the first Mach-Zehnder part 50. Each of the multiple second Mach-Zehnder parts 52 is equipped with second DC electrodes 26 used to generate DC electric fields in the corresponding second waveguides 16, and RF electrodes 30 used to apply RF electric fields in the corresponding second waveguides 16. The multiple second waveguides 16 in each of the second Mach-Zehnder parts 52 are coupled with the corresponding first waveguide 14. The second DC electrodes 26 in each of the second Mach-Zehnder parts 52 include electrodes that are provided on the second waveguides 16 and are supplied with a voltage C1 or C2, and a further electrode that is provided between the second waveguides 16 and is set at the ground voltage Gnd. The RF electrodes 30 in each of the Mach-Zehnder parts 52 include signal electrodes RF1 and RF2 provided on the second waveguides, and ground electrodes Gnd formed along the signal electrodes RF1 and RF2. The signal electrode RF1 and the ground electrode Gnd form a coplanar waveguide or line, and the signal electrode RF2 and the ground electrode Gnd form another coplanar waveguide or line.

A chip on which the first Mach-Zehnder part 50 and the second Mach-Zehnder parts 52 are formed may have a rectangular shape, for example. The optical waveguides extend along the long-sides of the chip.

A light signal is applied from the main waveguide 14 on the right-hand side of the figure (closer to the RF electrodes 30 than the second DC electrodes 26), and is split into the four second waveguides 16 of the pair of second Mach-Zehnder parts 52. In the pair of second Mach-Zehnder parts 52, the phases of the split light signals are modulated by RF signals propagated in the same direction as the direction of propagation of light in interaction parts 46 and 48 in which the signal electrodes RF1 and RF2 are provided on the second waveguides 16. For example, in the interaction part 46, a light signal corresponding to the I-signal is modulated. In the interaction part 48, a light signal corresponding to the Q-signal is modulated. As described above, the interaction parts 46 and 48 are sections in which the signals applied to the RF electrodes 30 act on the lights propagated through the second waveguides 16. Then, the operating points are adjusted in an interaction parts 44 in which the second DC electrodes 26 are provided on the second waveguides 16. The interaction parts 44 are sections in which the voltages applied to the second DC electrodes 26 act on the lights propagated through the second waveguides 16. The second DC electrodes 26 are configured to make it possible to separately apply the voltages C2 and C1 to the pair of second Mach-Zehnder parts 52. Thus, the operating points may be controlled independently in the pair of second Mach-Zehnder parts 52. The second waveguides 16 are combined, and the I-signal and the Q-signal are intensity modulated by the Mach-Zehnder interference.

The I-signal and the Q-signal are respectively propagated through the pair of first waveguides 14 of the first Mach-Zehnder part 50. In the first Mach-Zehnder part 50, the phase difference between the I-signal and the Q-signal is made equal to $\lambda/4$ (where $\lambda$ is the wavelength of the light signal) in the interaction part 42 in which the first DC electrodes 24 are provided on the first waveguides 14. As described above, the interaction part 42 is a section in which the voltages applied to the first DC electrodes 24 act on the lights propagated on the first waveguides. The first waveguides 14 are combined, and the I-signal and the Q-signal are thus output from the main waveguide 12.

In the first comparative example, integration of the first Mach-Zehnder part 50 and the second Mach-Zehnder parts 52 on the same substrate causes a trouble of crosstalk between the second Mach-Zehnder parts 52. In FIG. 1, an increased distance between the second Mach-Zehnder parts 52 increases suppress crosstalk but increases the chip size.

Figure 2:
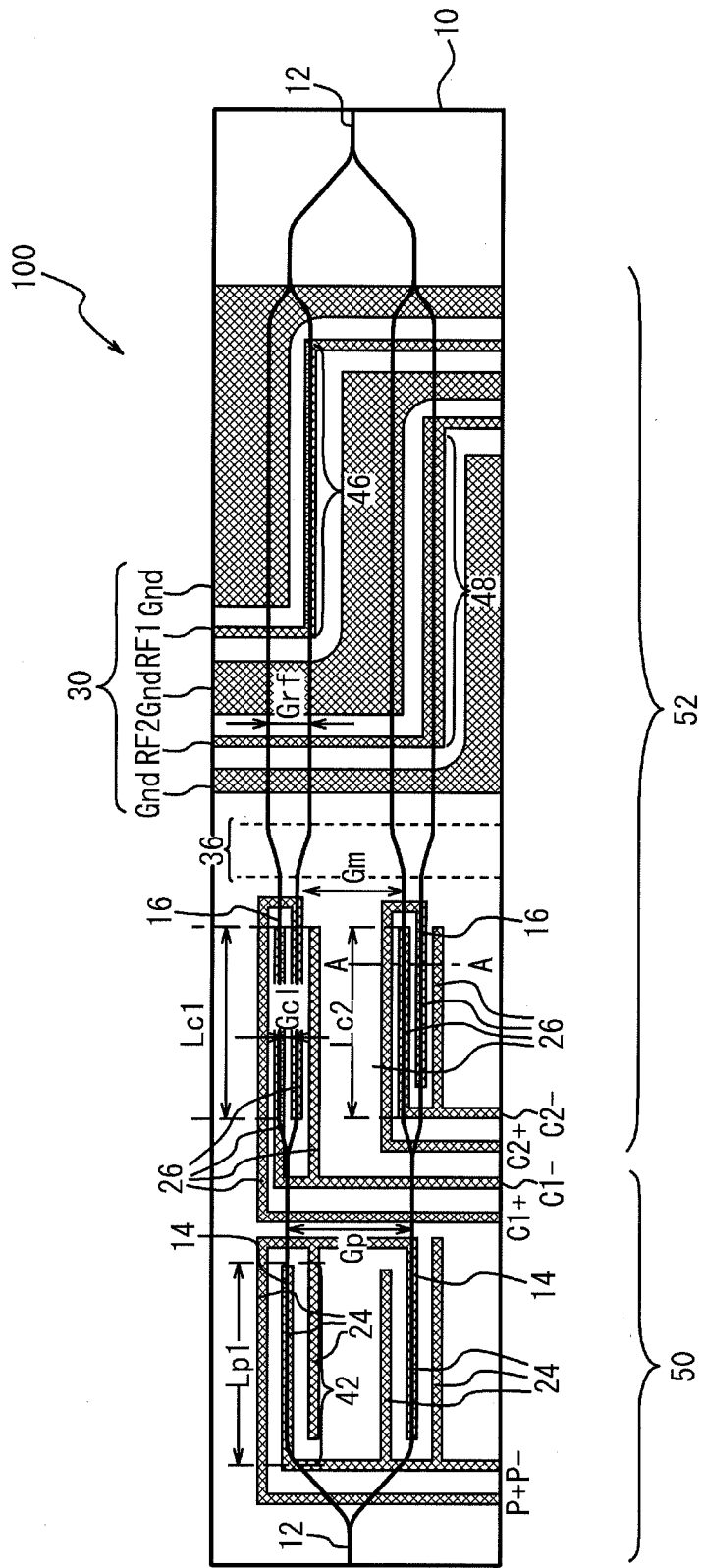
FIG. 2 is a plan view of an optical device in accordance with a first embodiment.

Now, a description is given of embodiments that suppress crosstalk between the second Mach-Zehnder parts.
First Embodiment FIG. 2 is a plan view of an optical device in accordance with a first embodiment. Referring to FIG. 2, an optical device 100 is configured so that DC voltages P+ and P− are applied to the first DC electrodes 24 in the first Mach-Zehnder part 50. The voltage P− is applied to the first DC electrode 24 on one of the first waveguides 14, and the voltage P+ is applied to the first DC electrodes 24 located at both sides of the first waveguide 14. The voltage P+ is applied to the first DC electrode 24 on the other first waveguide 14, and the voltage P− is applied to the first DC electrodes 24 located at both sides of the first waveguide 14. The length of the interaction part 42 in the first Mach-Zehnder part 50 is an interaction length Lp. The interaction length Lp may be a few mm, for example. By applying the voltages P+ and P− to the first DC electrodes 24, the phase difference between the I-signal and the Q-signal is made equal to $\lambda/4$.

In the second Mach-Zehnder parts 52, DC voltages C1+, C1−, C2+ and C2− are applied to the second DC electrodes 26. In one of the second Mach-Zehnder parts 52 on the upper side of FIG. 2, the voltage C1− is applied to the second DC electrode 26 on one of the second waveguides 16, and the voltage C1+ is applied to the second DC electrode 26 located further out than the second waveguide 16. Further, the voltage C1+ is applied to the second DC electrode 26 on the other second waveguide 16, and the voltage C1− is applied to the second DC electrode 26 located further out than the second waveguide 16. In the lower-side second Mach-Zehnder part 52, the second DC electrodes 26 are supplied with the voltages C2+ and C2−, similarly. The interaction parts 44 of the second Mach-Zehnder parts 52 are interaction lengths Lc1 and Lc2. The interaction lengths Lc1 and Lc2 may be a few mm, for example. By applying the voltages C1+, C1−, C2+ and C2− to the second DC electrodes 26, it is possible to control the operating points of the pair of second Mach-Zehnder parts 52 independently. The lengths of the second waveguides 16 to which the RF electrodes 30 are provided in the second Mach-Zehnder parts 52 are a few cm, for example. The other structures are the same as those of the first comparative example, and a description thereof is omitted here.

Figure 3:
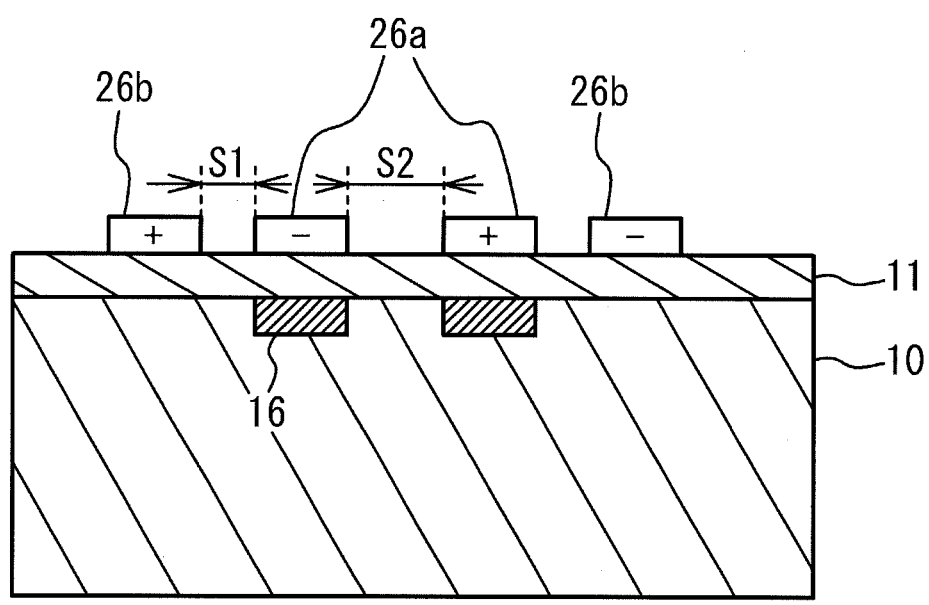
FIG. 3 is a cross-sectional view taken along a line A-A in FIG. 2.

FIG. 3 is a cross-sectional view taken along a line A-A in FIG. 2. The optical waveguides (the second optical waveguides 16 in FIG. 3) are formed in the substrate 10 having the electro-optical effect made of, for example, $LiNbO_3$ or $LiTaO_3$. The optical waveguides may be formed by forming a metal film made of, for example, Ti on the substrate 10 and causing the metal film to thermally diffuse into the substrate 10. The optical waveguides may be formed by proton exchange in benzoic acid. The thicknesses of the optical waveguides may be a few μm, and the widths thereof may be a few μm. A buffer layer 11 is formed on the substrate 10 in order to restrain lights propagated through the optical waveguides from leaking to the electrodes (the first electrodes 26a and the second electrodes 26b in FIG. 3). The buffer layer 11 may be a silicon oxide film and may be 0.2-2 μm thick. On the buffer layer 11, there are provided electrodes, which are formed by a metal film comprising a Ti film and an Au film stacked in this order from the lower side. The thicknesses of the electrodes are tens of nm to a few μm, for example.

As illustrated in FIG. 2, in the first embodiment, in the second Mach-Zehnder parts 52, the second DC electrodes 26 are not provided between the second waveguides 16. Generally, omission of the DC electrode from the Mach-Zehnder part causes an asymmetry of electrodes and degrades the efficiency of application of the electric fields to the waveguides. This increases a voltage $V\pi$ per unit length to be applied to the DC electrodes. Further, as illustrated in FIG. 2, a distance Gc1 between the second waveguides 16 on which the second DC electrodes 26 are provided is smaller than a distance Grf between the second waveguides 16 on which the RF electrodes 30 are provided. This difference in distance defines a changing part 36 in which the distance between the second waveguides 16 located between the parallel second waveguides 16 on which the RF electrodes 30 are provided and the parallel second waveguides on which the second DC electrodes 26 are provided. In the changing part 36, the second waveguides 16 are curved in an S shape and loss of light signal takes place. Further, if the distance Gc1 between the second waveguides 16 is small, crosstalk between the second waveguides 16 yields. This phenomenon is conspicuous on a long-wavelength side. Furthermore, reduction in the distance Gc1 between the second waveguides makes manufacturing unreliable.

However, the first embodiment is configured so that the first DC electrodes 24 are provided at least between the first waveguides 14 and are provided on the first waveguides 14 in the first Mach-Zehnder part 50 in which crosstalk hardly occurs. In contrast, in at least one of the second Mach-Zehnder parts 52 which may have a trouble of crosstalk, the second DC electrodes 26 are not provided between the second waveguides 16 but are provided on at least the second waveguides 16. It is thus possible to improve the efficiency of application of the electric fields to the first waveguides 14 in the first Mach-Zehnder part 50 in which crosstalk hardly occurs. In contrast, the distances Gc1 and Gc2 between the second waveguides 16 may be reduced in the regions in which the second DC electrodes 26 are formed in the second Mach-Zehnder parts 52 having a trouble of crosstalk. Thus, it is possible to increase the distance Gm between the second Mach-Zehnder parts 52 and suppress crosstalk between the second Mach-Zehnder parts 52.

For example, in simulation of the structure illustrated in FIG. 2, an increase in $V\pi \cdot Lc1$ or $V\pi \cdot Lc2$ from the first comparative example to the first embodiment is 3%-5% where $V\pi$ is the control voltage applied to the second DC electrodes 26, and Lc1 and Lc2 are interaction lengths, as described before. The voltage $V\pi$ due to crosstalk is improved by 2%. Thus, an increase in the control voltage $V\pi$ from the first comparative example to the first embodiment is approximately 2%. The first embodiment reduces crosstalk by 43 to 52% as compared to the first comparative example. When it is attempted to obtain the same effect by increasing the distance between the second Mach-Zehnder parts 52, the distance Gm is increased by around 30%. As described above, according to the first embodiment, although the product of $V\pi$ and Lc1 or Lc2 increases slightly, the distance Gm between the second Mach-Zehnder parts 52 is reduced and the chip size is also reduced.

As described above, the second Mach-Zehnder part 52 is configured so that the product of the control voltage $V\pi$ and the interaction length Lc1 or the product of the control voltage $V\pi$ and the interaction length Lc2 increases. It is thus preferable that the interaction lengths Lc1 and Lc2 of the second DC electrodes 26 and the second waveguides 16 of at least one of the multiple second Mach-Zehnder parts 52 is set greater than the interaction lengths Lp of the first DC electrodes 24 and the first waveguides 14. For example, the interaction lengths Lc1 and Lc2 may be set greater than the interaction lengths Lp by 5% to 10%. It is thus possible to make the control voltages $V\pi$ of the first Mach-Zehnder part 50 and the second Mach-Zehnder parts 52 approximately equal to each other.

In the first embodiment, as illustrated in FIG. 2, it is preferable that the second DC electrodes 26 are provided on the second waveguides 16 and are provided between the multiple second Mach-Zehnder parts 52. It is thus possible to suppress crosstalk between the second Mach-Zehnder parts 52.

If the spacing S2 between the first electrodes 26a is narrow, the lights propagated through the second waveguides 16 may interfere each other and the extinction ratio may be degraded. In contrast, if the spacing S2 between the first electrodes 26a is wide, the efficiency of application of the electric field may be degraded and the control voltage $V\pi$ may be increased. Further, crosstalk between the second Mach-Zehnder parts 52 may increase. With the above in mind, as illustrated in FIG. 3, it is preferable that the second DC electrodes 26 include the first electrodes 26a on the second waveguides 16 and the second electrodes 26b provided further out than the second waveguides 16, and the spacing S2 between the first electrodes 26a is made greater than the spacing S1 between the first electrodes 26a and the second electrodes 26b. It is thus possible to suppress interference between the second waveguides 16 and suppress crosstalk between the second Mach-Zehnder parts 52.

It is preferable that the distance Grf between the second waveguides 16 in the areas in which the RF electrodes 30 are provided is not small in order to ensure satisfactory RF bands. For example, the distance Grf may be tens of μm. In contrast, it is preferable that the distance Gc1 between the second waveguides 16 in the areas in which the second DC electrodes 26 are provided is small in order to ensure a great distance Gm (for example, hundreds of μm) between the second Mach-Zehnder parts 52. For example, the distance Gc1 may be a few μm. As described above, the distance Grf is preferably greater than the distance Gc1.

The distance between Gp the first waveguides 14 in the areas in which the first DC electrodes 24 are provided is as great as the distance Gm between the second Mach-Zehnder parts 52. It is thus preferable that the distance Gp is greater than the distance Grf.

Preferably, the number of the second DC electrodes 26 in at least one of the multiple second Mach-Zehnder parts 52 is smaller than that of the first DC electrodes 24 in the first Mach-Zehnder parts 50. It is thus possible to increase the distance Gc between the second Mach-Zehnder parts 52 and suppress crosstalk between the second Mach-Zehnder parts 52.

Second Embodiment

Figure 4:
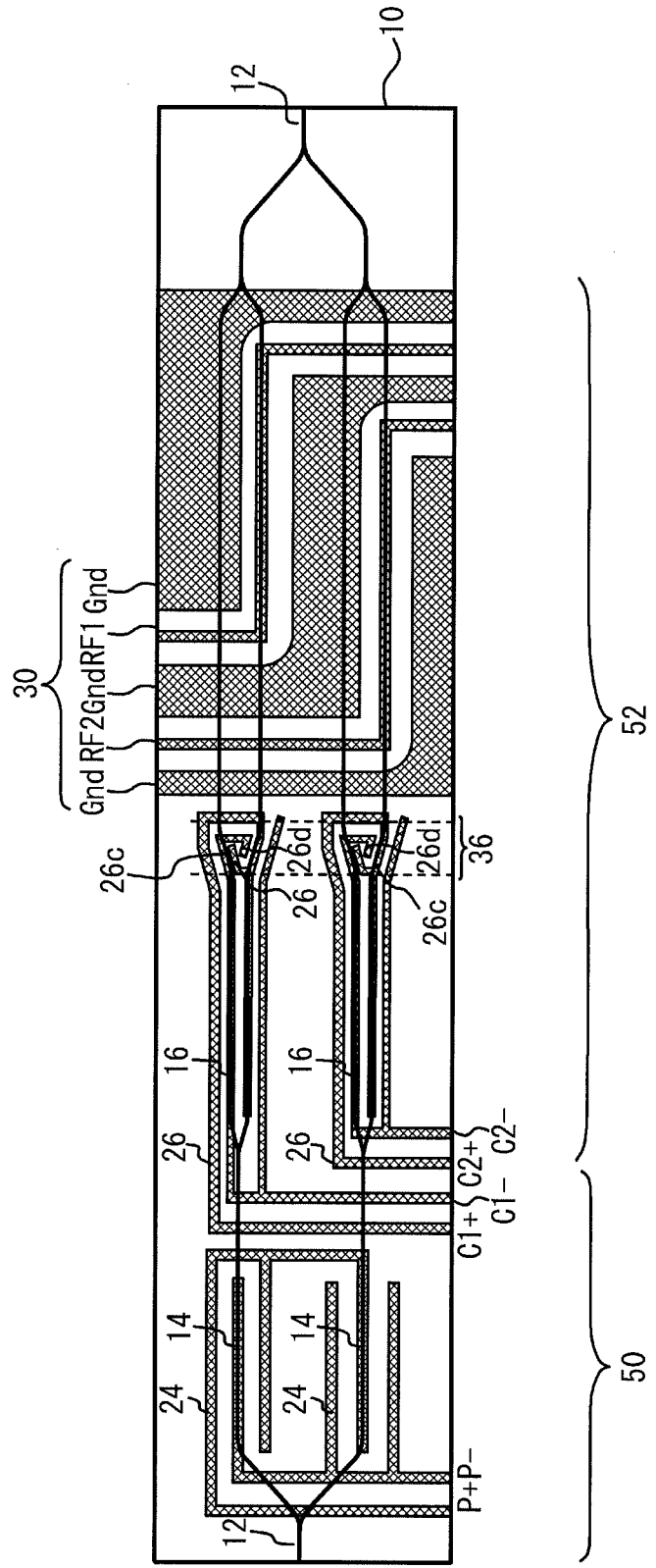
FIG. 4 is a plan view of an optical device in accordance with a second embodiment.

A second embodiment has an exemplary structure in which the second DC electrodes 26 extend up to the changing part 36. FIG. 4 is a plan view of an optical device in accordance with the second embodiment. As illustrated as second DC electrodes 26c, the second DC electrodes 26 are provided so as to extend up to the changing part 36. It is thus possible to increase the interaction length.

In the changing part 36, the distance between the second waveguides 16 is relatively great. Thus, even when the second DC electrodes 26 are provided on the second waveguides 16, the electric fields applied to the second waveguides 16 are weak. It is thus preferable that the second DC electrodes 26 are not provided between the second waveguides 16 extending in parallel, while second DC electrodes 26d are provided between the second waveguides 16 in the changing part 36. It is thus possible to improve the efficiency of application of the electric fields.

Third Embodiment

Figure 5:
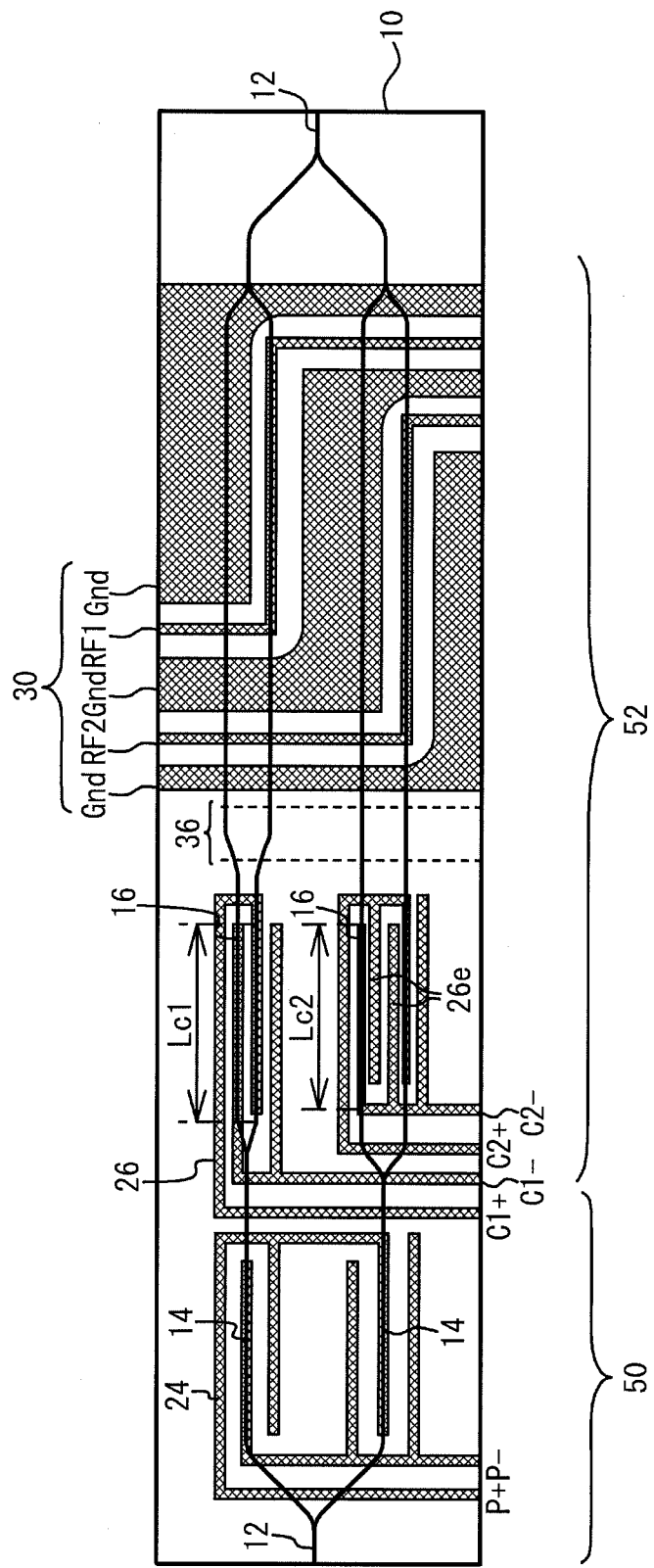
FIG. 5 is a plan view of an optical device in accordance with a third embodiment.

A third embodiment has an exemplary structure in which the second DC electrodes 26 are provided between the second waveguides 16 in one of the second Mach-Zehnder parts 52. FIG. 5 is a plan view of an optical device in accordance with the third embodiment. As illustrated in FIG. 5, in the lower-side second Mach-Zehnder part 52, second DC electrodes 26e are provided between the second waveguides 16. Thus, the interaction length Lc2 in the lower-side Mach-Zehnder part 52 may be smaller than the interaction length Lc1 in the upper-side Mach-Zehnder part 52. Further, the changing part 36 may be omitted from the lower-side second Mach-Zehnder part 52.

The third embodiment does not have the second DC electrodes 26 between the second waveguides 16. This is because it is enough to provide the second DC electrodes 26 between the second waveguides 16 in only one of the multiple second Mach-Zehnder parts 52. The multiple second Mach-Zehnder parts 52 may have the different values of the interaction lengths Lc1 and Lc2.

Fourth Embodiment

Figure 6:
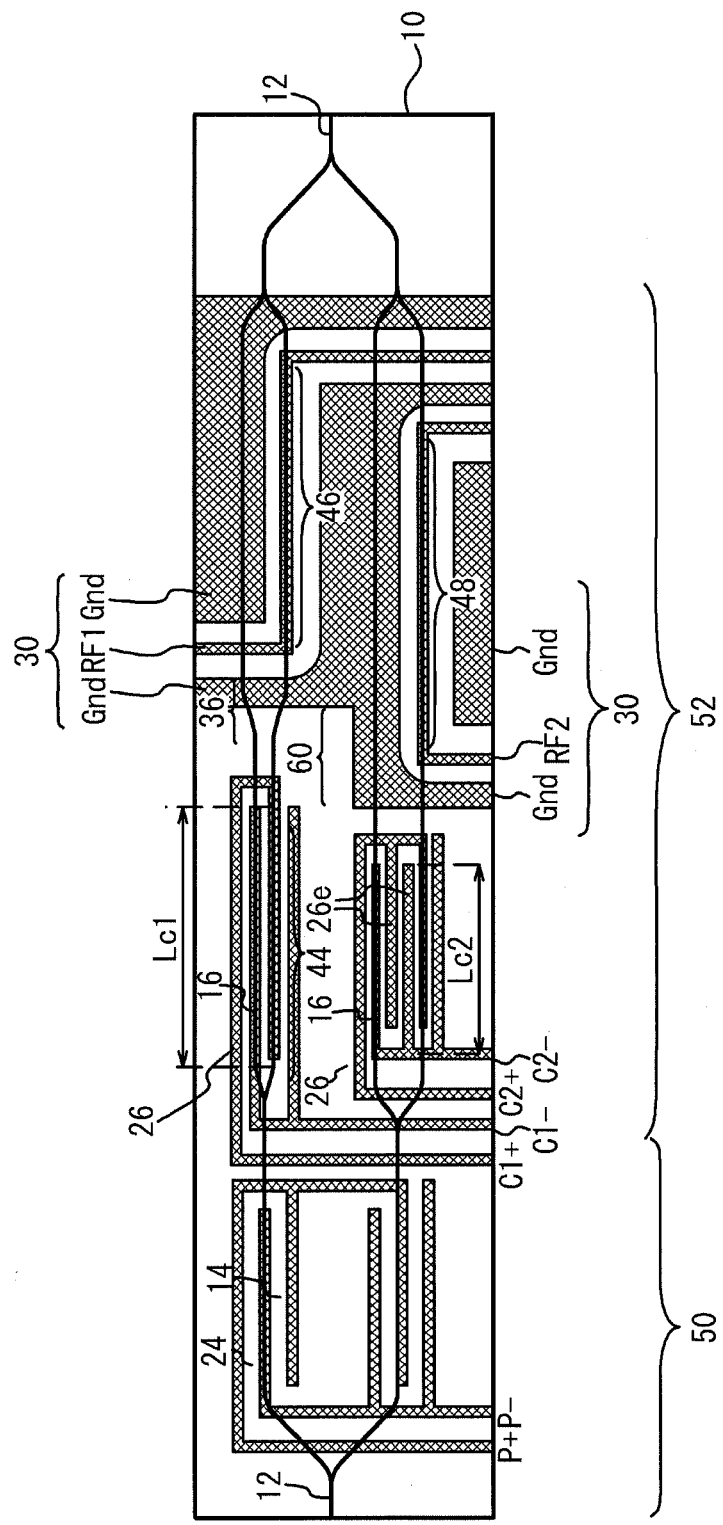
FIG. 6 is a plan view of an optical device in accordance with a fourth embodiment.

FIG. 6 is a plan view of a fourth embodiment. As illustrated in FIG. 6, the RF electrodes 30 are provided for an arrangement in which the second waveguides 16 in one of the multiple second Mach-Zehnder parts 52 (the lower-side part in FIG. 6) are longer than those in the other second Mach-Zehnder part 52 (upper-side part). For example, in FIG. 5 related to the third embodiment, the signal electrodes RF1 and RF2 out of the RF electrodes 30 are wired from the lower long-side of the substrate 10 to the upper long-side thereof. In contrast, in FIG. 6, the signal electrode RF2 is wired from the lower long-side of the substrate 10 to the lower long-side thereof (that is, the same long-side). Thus, in the upper-side second Mach-Zehnder part 52 in FIG. 6, the RF electrodes 30 may be advantageously shorter by an area 60 for wiring the signal electrode RF2 on the upper long-side.

Taking the above into consideration, the second DC electrodes 26 are provided between the second waveguides 16 in one of the second Mach-Zehnder parts 52 (lower side). The interaction length Lc2 of the second DC electrodes 26 and the second waveguides 16 in the lower-side second Mach-Zehnder part 52 is made smaller than that in the upper-side second Mach-Zehnder part 52. It is thus possible to realize efficient arrangement on the chip.

Fifth Embodiment

Figure 7:
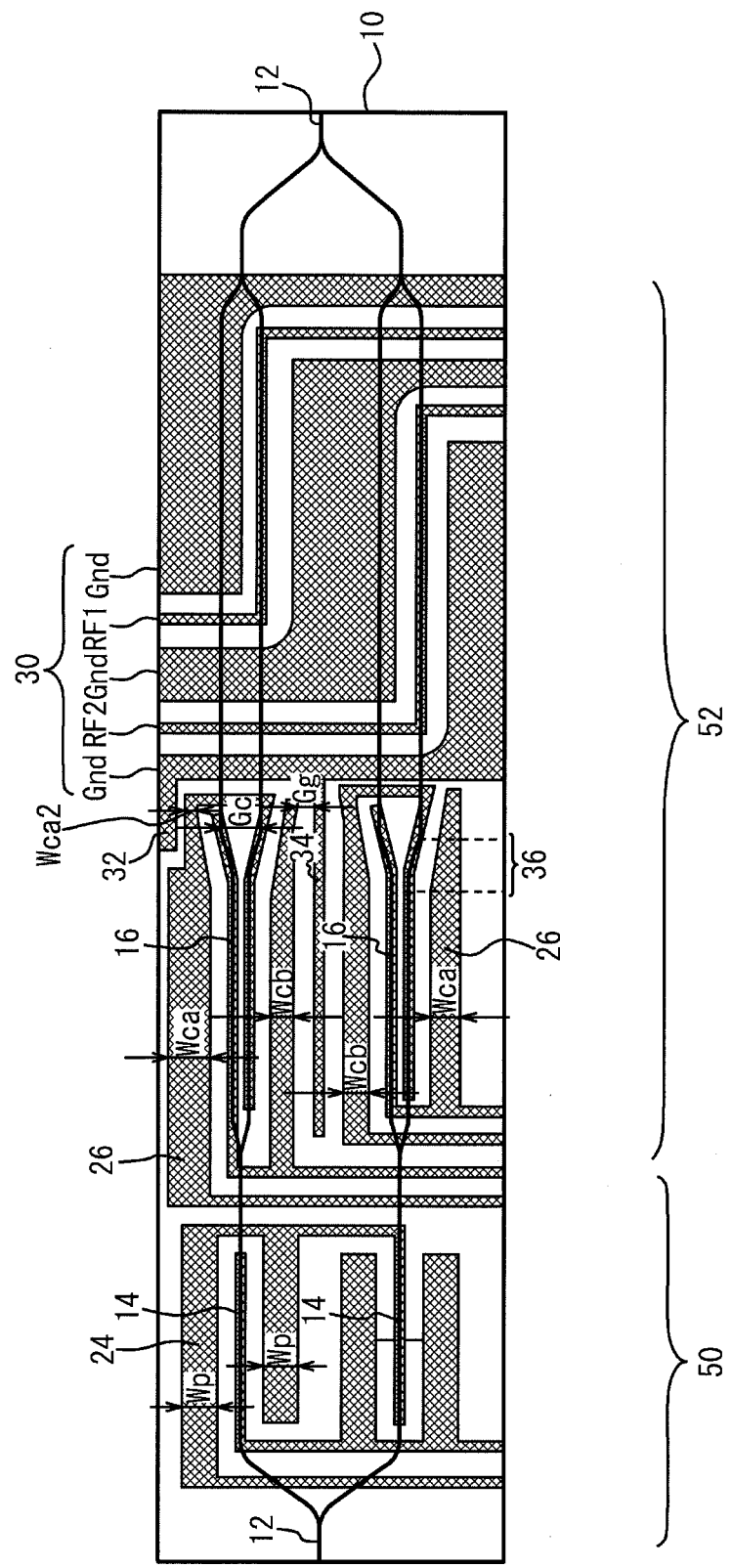
FIG. 7 is a plan view of an optical device in accordance with a fifth embodiment.

FIG. 7 is a plan view of a fifth embodiment. Referring to FIG. 7, as the second DC electrodes 26 arranged along the second waveguides 16 are wider, the electric fields applied to the second waveguides 16 are stronger. However, when the widths Wcb of the second DC electrodes 26 between the second Mach-Zehnder parts 52 are great, crosstalk between the second Mach-Zehnder part s52 increases. Taking the above into consideration, the widths Wcb of the second DC electrodes 26 in the areas between the multiple second Mach-Zehnder parts 52 may be made smaller than the widths Wca of the second DC electrodes 26 in areas that are outside of the multiple second Mach-Zehnder parts 52. It is thus possible to improve the efficiency of application of the electric fields and suppress crosstalk.

In the first Mach-Zehnder part 50, there is no problem about crosstalk between the Mach-Zehnder parts. It is thus possible to make the widths Wp of the first DC electrodes 24 arranged along the first waveguides 14 greater than the widths Wca and Wcb of the second DC electrodes 26 in the areas arranged along the second waveguides 16.

There is provided a ground electrode 34 between the second DC electrodes 26 of the multiple second Mach-Zehnder parts 52. It is thus possible to suppress crosstalk between the second Mach-Zehnder parts 52. The distance between the second waveguides 16 in the changing part 36 is preferably smaller than the distance Gg between the ground electrode 34 and the second DC electrodes 26. This is because, if the distance Gc is greater than the distance Gg, an electric field applied between the ground electrode 34 and the second DC electrodes 26. Although FIG. 7 is illustrated so that the distance Gc is greater than the distance Gg, Gc is actually smaller than Gg.

The ground electrodes Gnd arranged along the signal electrode RF2 out of the RF electrodes 30 may be narrowed as long as the coplanar waveguides are functionally realized. A bonding pad for making an external connection may be provided on the ground electrodes Gnd. In the fifth embodiment, as illustrated in FIG. 7, a portion 32 of the RF electrodes 30 (a portion of one of the ground electrodes Gnd) protrudes towards the second DC electrodes 26. This protruding portion 32 may be used as a bonding pad for the ground electrode Gnd. Preferably, the portion 32 is juxtaposed to the second DC electrode 26 in the direction perpendicular to the direction in which the second waveguides 16 extend. It is thus possible to reduce the chip size in the direction in which the second waveguides 16 extend.

Preferably, the width Wca2 of a portion of the second DC electrode 26 juxtaposed to the protruding position 32 is smaller than the widths Wca of the second electrodes 26 other than the above portion. It is thus possible to ensure the place for providing the bonding pad and increase the electric fields applied to the second waveguides.

Sixth Embodiment

Figure 8:
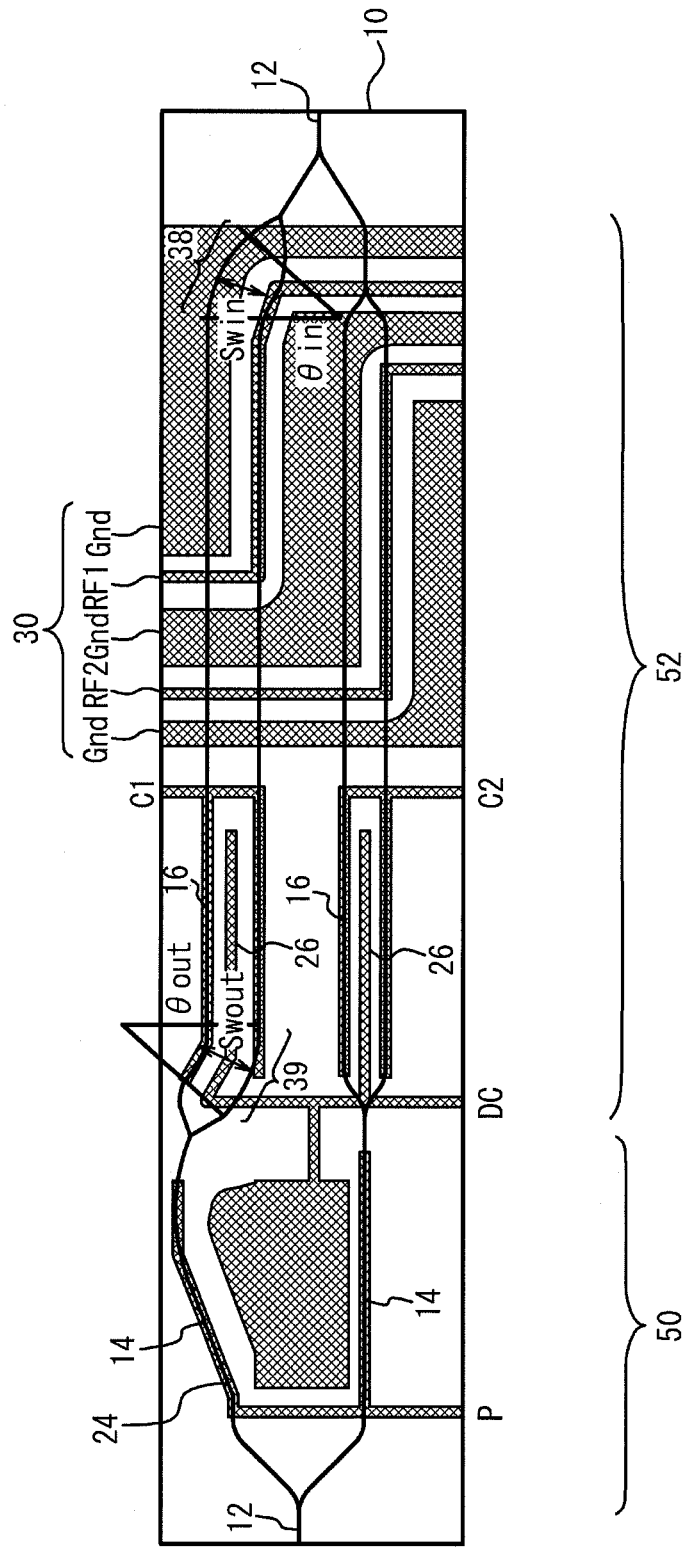
FIG. 8 is a plan view of an optical device in accordance with a second comparative example.

A sixth embodiment has an exemplary structure in which the second waveguides 16 have bent portions. FIG. 8 is a plan view of an optical device in accordance with a second comparative example. Referring to FIG. 8, the second comparative example is configured so that the second waveguides 16 are bent on the input side of the RF electrodes 30 in order to reduce the length of the chip. Assuming that the angle of bending the second waveguides 16 in a bent portion 38 is denoted as θin and the distance between the second waveguides 16 is denoted as Swin, the outer second waveguide 16 in the bent portion 38 is Swin·sin(θin) longer than the inner second waveguide 16 in the bent portion 38. Thus, a bent portion having a bending angle θout is provided on the output side of the second waveguides 16. Assuming that the angle of bending the second waveguides 16 in the bent portion 39 is denoted as θout and the distance between the second waveguides is denoted as Swout, the inner second waveguide 16 in the bent portion 39 is Swout·sin(θout) longer than the outer second waveguide 16 in the bent portion 39. When Swin·sin(θin) and Swout·sin(θout) are made equal to each other, the pair of second waveguides 16 are equal in length.

However, in case where the bent portion 39 is provided in the first embodiment as in the case of the second comparative example, it may be difficult to make the pair of second waveguides 16 equal in length to each other because the first embodiment has a small value of Swout.

Figure 9:
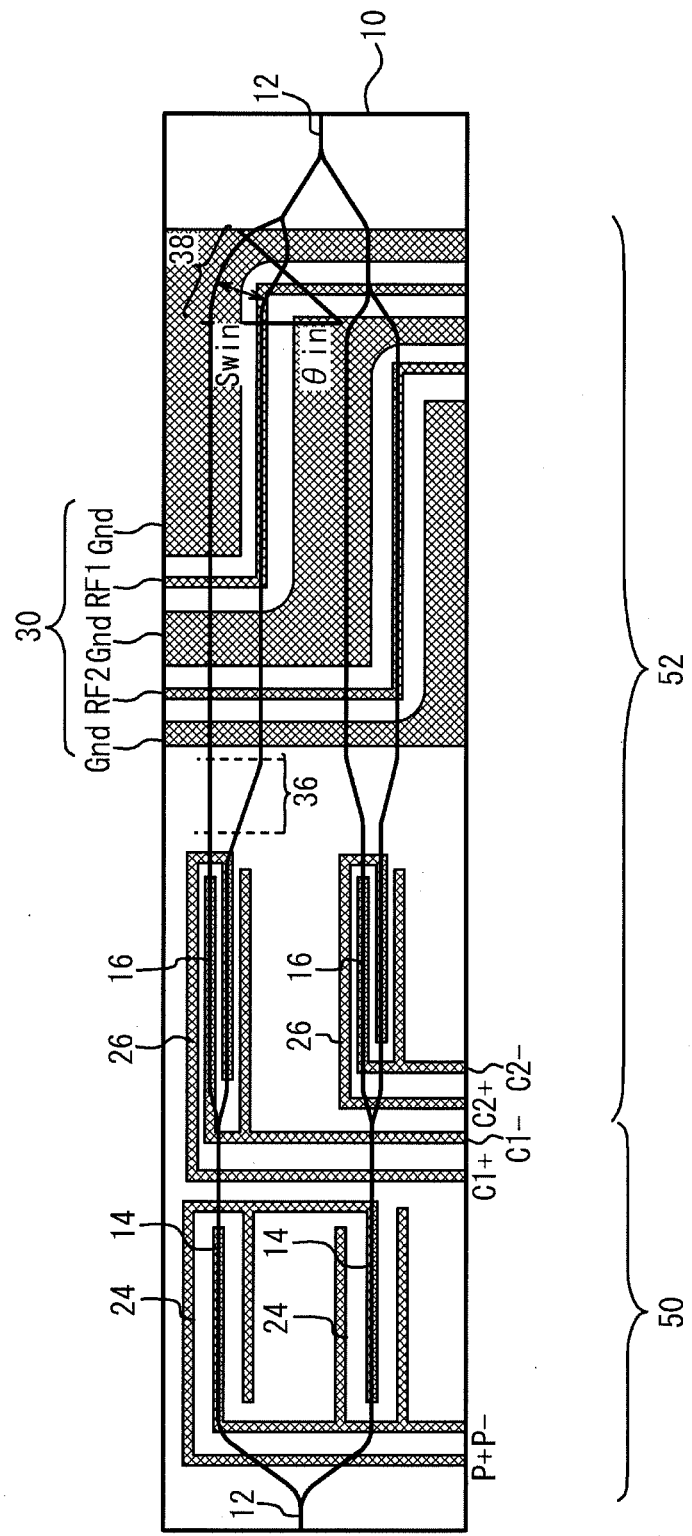
FIG. 9 is a plan view of an optical device in accordance with a sixth embodiment.

FIG. 9 is a plan view of the sixth embodiment. Referring to FIG. 9, in the sixth embodiment, at least one of the multiple mach-Zehnder parts 52 is configured so that the second waveguides 16 are bent in the bent portion 38. The distance between the second waveguides 16 in the areas in which the RF electrodes are provided is greater than the distance between the second waveguides in the areas in which the second DC electrodes 26 are provided. Preferably, in the changing part in which the distance between the second waveguides 16 changes, the second waveguide 16 located further in than the other in the bent portion 38 is bent, while the second waveguide 16 located further out than the other in the bent portion 38 is straight. It is thus possible to make the pair of second waveguides 16 equal in length to each other.

In the changing part 36, the pair of second waveguides 16 may have different radii of curvature or may have different bending angles, and may be equalized in length.

Seventh Embodiment

Figure 10:
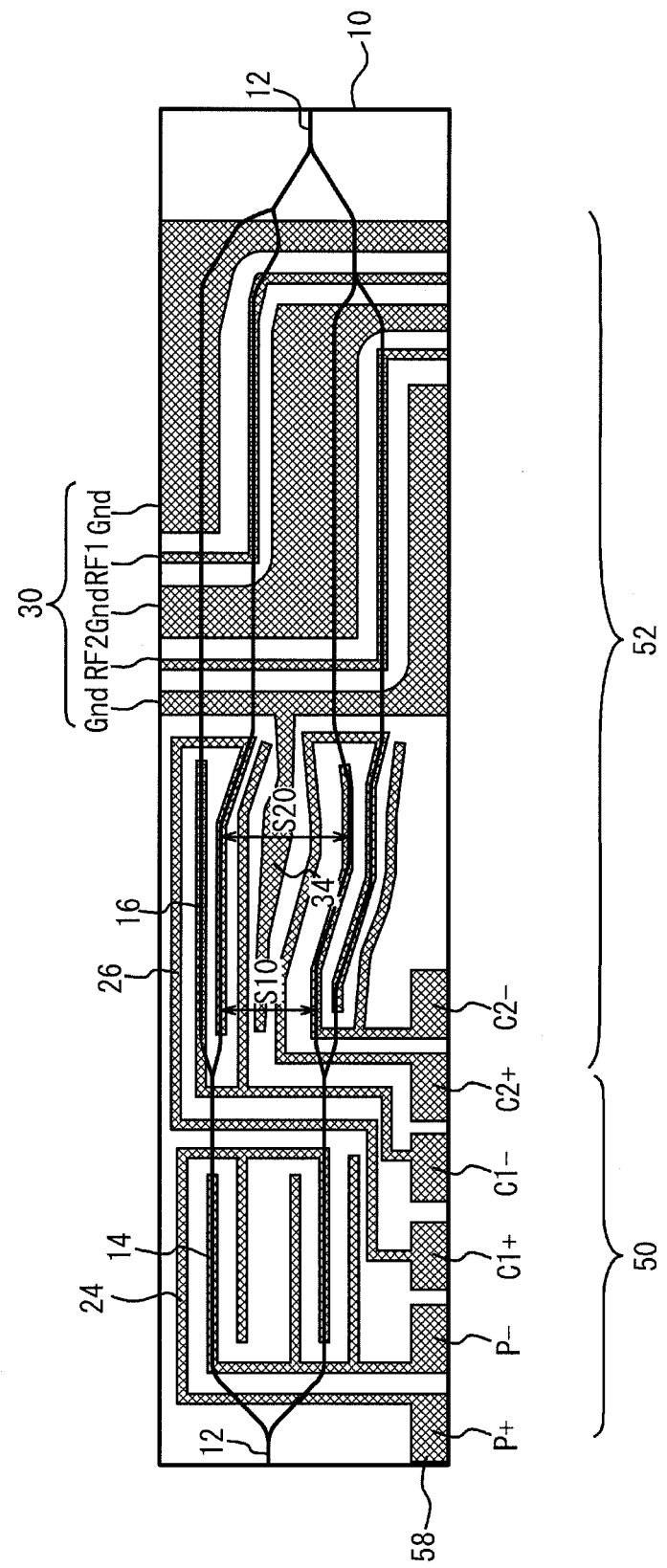
FIG. 10 is a plan view of an optical device in accordance with a seventh embodiment.

A seventh embodiment has an exemplary structure in which DC electrode pads are provided. FIG. 10 is a plan view of an optical device in accordance with the seventh embodiment. Referring to FIG. 10, pads 58, which may be bonding pads, are arranged along the lower long side of the substrate 10 from the side of the first Mach-Zehnder part 50 to a part of the multiple Mach-Zehnder parts 52. The pads 58 are used to make external connections with the first DC electrodes 24 and the second DC electrodes 26. It is thus possible to lengthen the pads 58. Since the pads 58 are provided up to the part of the second Mach-Zehnder parts 52, the distances S10 and S20 between the second waveguides 16 in the adjacent second Mach-Zehnder parts 52 become greater as the distances become further away from the first Mach-Zehnder part 50.

In a case where the ground electrode 34 is provided between the multiple second Mach-Zehnder parts 52, the ground electrode 34 becomes wider as the ground electrode 34 becomes further away from the first Mach-Zehnder part 50. It is thus possible to keep the distances between the second waveguides 16 and the ground electrode 34 constant.

Eighth Embodiment

Figure 11:
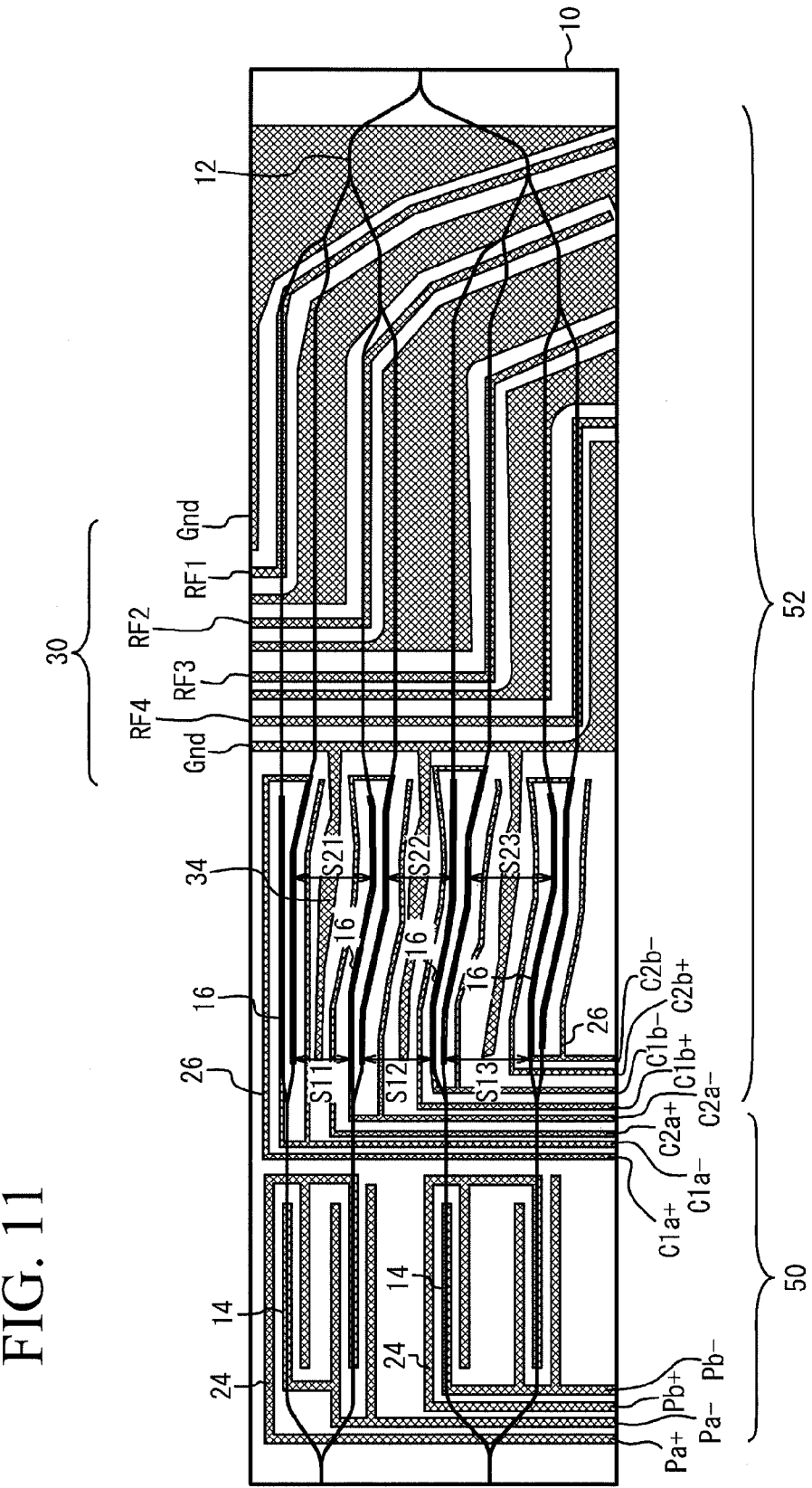
FIG. 11 is a plan view of an optical device in accordance with an eighth embodiment.

An eighth embodiment is an exemplary DP-QPSK (Dual Polarization Differential Quadrature Phase Shift Keying). FIG. 11 is a plan view of an optical device in accordance with the eighth embodiment. Referring to FIG. 11, there are four second Mach-Zehnder parts 52, and two first Mach-Zehnder parts 50. The four Mach-Zehnder parts 52 intensity-modulate the I-signals and the Q-signals of orthogonally polarized waves, respectively. The first DC electrodes 24 are supplied with voltages Pa+, Pa−, Pb+ and Pb−. The second DC voltages are supplied with voltages C1a+, C1a−, C2a+, C2a−, C1b+, C1b−, C2b+ and C2b−. The RF electrodes 30 include signal electrodes RF1, RF2, RF3 and RF4.

As illustrated in FIG. 11, in a case where three or more second Mach-Zehnder parts 52 are arranged side by side, each of the second Mach-Zehnder parts 52 is configured to set the distances S11, S12 and S13 between the second waveguides 16 in the adjacent Mach-Zehnder parts equal to each other and to set the distances S21, S22 and S23 between the second waveguides 16 in the adjacent Mach-Zehnder parts equal to each other. For example, the distances between the second waveguides 16 in the adjacent two of the second Mach-Zehnder parts 52 are made thoroughly equal to each in the direction in which the second waveguides 16 extend. It is thus possible to suppress crosstalk between the adjacent second Mach-Zehnder parts.

In case the distances between the second waveguides 16 in each of the second Mach-Zehnder parts 52 are made thoroughly equal to each in the direction in which the second waveguides 16 extend, the average distances between the second waveguides 16 on which the second DC electrodes 26 are provided in the second Mach-Zehnder parts 52 are made equal to each other. It is thus possible to suppress crosstalk between the second Mach-Zehnder parts 52.

Ninth Embodiment

Figure 12:
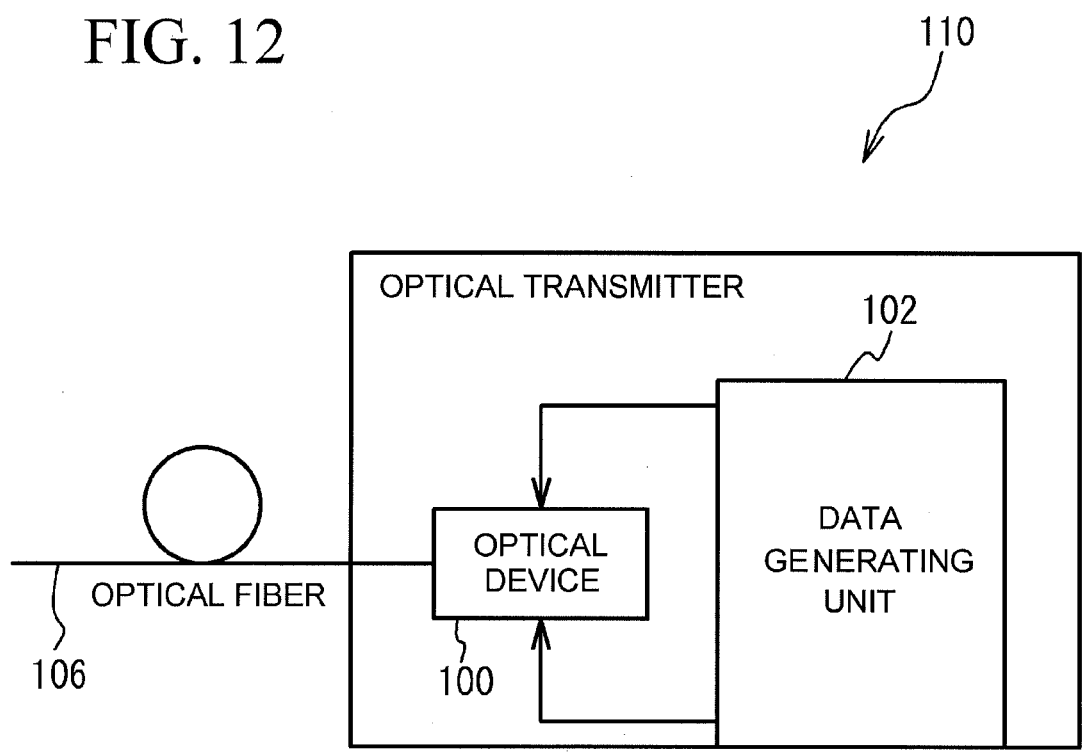
FIG. 12 is a plan view of an optical device in accordance with a ninth embodiment.

A ninth embodiment is an exemplary optical transmitter including the optical device configured according to any of the first through eighth embodiments. FIG. 12 is a block diagram of an optical transmitter in accordance with the eighth embodiment. Referring to FIG. 12, an optical transmitter 110 includes an optical device 100 and a data generating part 102. Data generated by the data generating part 102 is output to an optical fiber 106 as a light signal that is QPSK modulated by the optical device 100.

As described above, the optical device in accordance with any of the first through eight embodiments may be applied to the optical transmitter 110 like the ninth embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical device comprising:
   a substrate having an electro-optical effect;
   a main waveguide provided on the substrate;
   a first Mach-Zehnder part having first waveguides provided on the substrate and coupled with the main waveguide, and first DC electrodes provided between the first waveguides and on the first waveguides and used to generate DC electric fields in the first waveguides; and
   second Mach-Zehnder parts respectively associated with the first waveguides and comprising second waveguides coupled with each of the first waveguides and second DC electrodes used to generate DC electric fields in the second waveguides,
   at least one of the second Mach-Zehnder parts being configured to have no second DC electrode provided between the second waveguides included in one of said at least one of the second Mach-Zehnder parts and have the second DC electrodes provided on the second waveguides included in said one of said at least one of the second Mach-Zehnder parts.

2. The optical device according to claim 1, wherein the second DC electrodes are provided on the second waveguides and between the second Mach-Zehnder parts.

3. The optical device according to claim 1, wherein:
   the second DC electrodes included in said one of said at least one of the second Mach-Zehnder parts includes first electrodes provided on the second waveguides and second electrodes that are provided further out than the second waveguides; and
   a distance between the first electrodes is greater in a width direction of the second waveguides than a distance between the first electrodes and the second electrodes in the width direction.

4. The optical device according to claim 1, wherein a length in interaction between the second DC electrodes and the second waveguides included in one of said at least one of the second Mach-Zehnder parts is greater than a length in interaction between the first DC electrodes and the first waveguides in the first Mach-Zehnder part.

5. The optical device according to claim 1, wherein a number of the second DC electrodes included in one of said at least one of the second Mach-Zehnder parts is smaller than that of the first DC electrodes in the first Mach-Zehnder part.

6. The optical device according to claim 1, wherein a width of the second DC electrodes provided between the second Mach-Zehnder parts is smaller than a width of the second DC electrodes provided outside of the second Mach-Zehnder parts.

7. The optical device according to claim 1, wherein a width of one of the first DC electrodes provided along the first waveguides is greater than that of one of the second DC electrodes provided along the second waveguides.

8. The optical device according to claim 1, wherein the second Mach-Zehnder parts include RF electrodes that are provided on the second waveguides and are used to apply RF electric fields to the second waveguides.

9. The optical device according to claim 1, wherein in said at least one of the Mach-Zehnder parts, a distance between the second waveguides in areas in which the RF electrodes are provided is greater than that in areas in which the second DC electrodes are provided.

10. The optical device according to claim 9, wherein a distance between the first waveguides in areas in which the first DC electrodes are provided is greater than that between the second waveguides in the areas in which the RF electrodes are provided.

11. The optical device according to claim 9, wherein in said at least one of the second Mach-Zehnder parts, the second DC electrodes are configured to extend up to a changing part that is provided between the second waveguides in the areas in which the RF electrodes are provided and the second waveguides in the areas in which the second DC electrodes are provided and has a changing distance between the second waveguides.

12. The optical device according to claim 11, wherein the second DC electrodes are provided in the second waveguides in the changing part.

13. An optical device comprising:
a substrate having an electro-optical effect;
a main waveguide provided on the substrate;
a first Mach-Zehnder part having first waveguides provided on the substrate and coupled with the main waveguide, and first DC electrodes provided between the first waveguides and on the first waveguides and used to generate DC electric fields in the first waveguides; and
second Mach-Zehnder parts respectively associated with the first waveguides and comprising second waveguides coupled with each of the first waveguides and second DC electrodes used to generate DC electric fields in the second waveguides,
at least one of the second Mach-Zehnder parts being configured to have no second DC electrode provided between the second waveguides and have the second DC electrodes on the second waveguides,
wherein:
the second Mach-Zehnder parts include RF electrodes that are provided on the second waveguides and are used to apply RF electric fields to the second waveguides;
the second waveguides in said at least one of the second Mach-Zehnder parts are provided with the RF electrodes that are longer than those of another one of the second Mach-Zehnder parts;
the DC electrodes are provided between the second waveguides in said at least one of the second Mach-Zehnder parts; and
a length in interaction between the second DC electrodes and the second waveguides in said at least one of the second Mach-Zehnder parts is smaller than that in another one of the second Mach-Zehnder parts.

14. The optical device according to claim 11, wherein:
a ground electrode is provided between the second Mach-Zehnder parts; and
a distance between the second waveguides in the changing part is greater than a distance between the ground electrode and the second DC electrodes.

15. An optical device comprising:
a substrate having an electro-optical effect;
a main waveguide provided on the substrate;
a first Mach-Zehnder part having first waveguides provided on the substrate and coupled with the main waveguide, and first DC electrodes provided between the first waveguides and on the first waveguides and used to generate DC electric fields in the first waveguides; and
second Mach-Zehnder parts respectively associated with the first waveguides and comprising second waveguides coupled with each of the first waveguides and second DC electrodes used to generate DC electric fields in the second waveguides,
at least one of the second Mach-Zehnder parts being configured to have no second DC electrode provided between the second waveguides and have the second DC electrodes on the second waveguides,
wherein:
the second Mach-Zehnder parts include RF electrodes that are provided on the second waveguides and are used to apply RF electric fields to the second waveguides;
a portion of the RF electrodes protrudes towards the second DC electrodes, and is juxtaposed to the second DC electrodes.

16. The optical device according to claim 15, wherein the second DC electrodes are narrowed in a position in which the second DC electrodes juxtaposes the portion of the RF electrodes.

17. An optical device comprising:
a substrate having an electro-optical effect;
a main waveguide provided on the substrate;
a first Mach-Zehnder part having first waveguides provided on the substrate and coupled with the main waveguide, and first DC electrodes provided between the first waveguides and on the first waveguides and used to generate DC electric fields in the first waveguides; and
second Mach-Zehnder parts respectively associated with the first waveguides and comprising second waveguides coupled with each of the first waveguides and second DC electrodes used to generate DC electric fields in the second waveguides,
at least one of the second Mach-Zehnder parts being configured to have no second DC electrode provided between the second waveguides and have the second DC electrodes on the second waveguides,
wherein:
the second Mach-Zehnder parts include RF electrodes that are provided on the second waveguides and are used to apply RF electric fields to the second waveguides;
in said at least one of the second Mach-Zehnder parts, the second waveguides are bent in a bent portion;
the distance between the second waveguides in the areas in which the RF electrodes are provided is greater than that between the second waveguides in the areas in which the second DC electrodes are provided; and
in the changing part in which the distance between the second waveguides is changing, an inner one of the second waveguides is bent in the bent portion, while an outer one of the second waveguides is straight.

18. The optical device according to claim 1, wherein:
pads for making external connections with the first DC electrodes and the second DC electrodes are provided from a side of the first Mach-Zehnder part up to a part of a side of the second Mach-Zehnder parts; and the distance between the second waveguides between adjacent two of the second Mach-Zehnder parts becomes greater as the distance becomes further away from the first Mach-Zehnder part.

19. The optical device according to claim 1, wherein:

the second Mach-Zehnder parts includes three or more second Mach-Zehnder parts; and average distances between the second waveguides on which the second DC electrodes are provided between adjacent two of the second Mach-Zehnder parts are equal to each other.

20. An optical transmitter comprising:

an optical device; and a data generating part configured to generate data which is sent to an optical fiber by the optical device, the optical device comprising:

a substrate having an electro-optical effect;

a main waveguide provided on the substrate;

a first Mach-Zehnder part having first waveguides provided on the substrate and coupled with the main waveguide, and first DC electrodes provided between the first waveguides and on the first waveguides and used to generate DC electric fields in the first waveguides; and second Mach-Zehnder parts respectively associated with the first waveguides and comprising second waveguides coupled with each of the first waveguides and second DC electrodes used to generate DC electric fields in the second waveguides, at least one of the second Mach-Zehnder parts being configured to have no second DC electrode provided between the second waveguides included in one of said at least one of the second Mach-Zehnder parts and have the second DC electrodes provided on the second waveguides included in said one of said at least one of the second Mach-Zehnder parts.

* * * * *